United States Patent
Shao et al.

(10) Patent No.: US 12,361,434 B2
(45) Date of Patent: Jul. 15, 2025

(54) METHODS, INTERNET OF THINGS (IoT) SYSTEMS, AND STORAGE MEDIA FOR SMART GAS CONSTRUCTION SUPERVISION

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Siwei Zeng, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/823,648

(22) Filed: Sep. 3, 2024

(65) Prior Publication Data

US 2024/0428266 A1 Dec. 26, 2024

(30) Foreign Application Priority Data

Aug. 8, 2024 (CN) .......................... 202411080666.2

(51) Int. Cl.
*G06Q 30/018* (2023.01)
*G06N 7/01* (2023.01)
(Continued)

(52) U.S. Cl.
CPC ............ *G06Q 30/018* (2013.01); *G06N 7/01* (2023.01); *G06N 20/00* (2019.01); *G06Q 50/08* (2013.01)

(58) Field of Classification Search
CPC .... G06Q 30/018; G06Q 50/08; G06Q 10/103; G06Q 50/06; G06Q 50/265; G06N 7/01;
(Continued)

(56) References Cited

U.S. PATENT DOCUMENTS

| | | | |
|---|---|---|---|
| 2023/0153716 A1* | 5/2023 | Kumar | G06F 18/217 705/7.22 |
| 2023/0251634 A1 | 8/2023 | Shao et al. | |
| 2023/0252374 A1 | 8/2023 | Shao et al. | |

FOREIGN PATENT DOCUMENTS

| | | |
|---|---|---|
| CN | 115823500 A | 3/2023 |
| CN | 116091080 A | 5/2023 |

(Continued)

OTHER PUBLICATIONS

Wang, Dawei, Application Analysis of Internet of Things Technology in Smart City Gas Pipe Network Monitoring, China High-Tech, 14: 139-141, 2023.

(Continued)

*Primary Examiner* — Jonathan P Ouellette
(74) *Attorney, Agent, or Firm* — METIS IP LLC

(57) ABSTRACT

Provide are a method, IoT system, and storage medium for smart gas construction supervision. The method includes: obtaining monitoring image data from a gas supervision device; determining a project impact level and a project estimated completion time of a gas construction project based on the monitoring image data, sending the project impact level to a gas company management platform, and sending the project estimated completion time to a citizen user platform for announcement and display; determining regulatory parameters based on the project impact level and the project estimated completion time, and sending the regulatory parameters to a gas equipment object platform; obtaining pipeline pressure values through one or more gas pressure regulating devices; determining a fluctuation characteristic or a pressure difference distribution characteristic based on the pipeline pressure values; and generating a pressure regulating instruction based on the regulatory (Continued)

parameters, and the fluctuation characteristic or the pressure difference distribution characteristic.

9 Claims, 6 Drawing Sheets

(51) Int. Cl.
  *G06N 20/00* (2019.01)
  *G06Q 10/087* (2023.01)
  *G06Q 10/10* (2023.01)
  *G06Q 30/02* (2023.01)
  *G06Q 30/06* (2023.01)
  *G06Q 50/08* (2012.01)

(58) Field of Classification Search
  CPC ........ G06N 20/00; G16Y 10/35; G16Y 40/10; G16Y 40/50
  USPC .................. 705/1.1–912, 301, 314, 315, 317
  See application file for complete search history.

(56) References Cited

FOREIGN PATENT DOCUMENTS

| | | |
|---|---|---|
| CN | 109670795 B | 6/2023 |
| CN | 118012848 A | 5/2024 |
| CN | 118391599 A | 7/2024 |
| RU | 2743669 C1 | 2/2021 |
| WO | 2024138659 A1 | 7/2024 |

OTHER PUBLICATIONS

Gao, Jinliang, Innovative Water Supply Network Pressure Management Method—The Establishment and Application of the Intelligent Pressure-Regulating Vehicle, Energies, 2022, 15 pages.

Notification to Grant Patent Right for Invention in Chinese Application No. 202411080666.2 mailed on Sep. 30, 2024, 4 pages.

* cited by examiner

METHODS, INTERNET OF THINGS (IoT) SYSTEMS, AND STORAGE MEDIA FOR SMART GAS CONSTRUCTION SUPERVISION

CROSS-REFERENCE TO RELATED APPLICATIONS

This application claims priority to Chinese application No. 202411080666.2, filed Aug. 8, 2024, the entire contents of which are incorporated herein by reference.

TECHNICAL FIELD

The present disclosure relates to the field of gas construction technology, and in particular, to a method, an Internet of Things (IoT) system, and a storage medium for smart gas construction supervision.

BACKGROUND

New subdivisions or commercial buildings within a city are usually accompanied by projects for the construction or expansion of new gas supply facilities, as well as projects for the reconstruction (including upgrading) of gas pipelines, or similar projects (hereinafter collectively referred to as gas construction projects). When a plurality of gas construction projects are taking place in a region, an original gas supply plan may be affected. For example, problems such as intermittent shortages of gas supply in a portion of the region may occur. The current solution is to take appropriate countermeasures based on monitoring data analysis to identify gas problems.

CN109670795B provides an engineering management system based on big data. The system analyzes collected image data and progress reports uploaded by each project manager based on the processing capability of big data, so as to realize real-time monitoring of construction progress. It may be seen that the system does not address the issue of considering the gas pipeline network as a whole when introducing new gas construction projects. Specifically, when addressing gas supple problems in the region where a new gas construction project is introduced, the system does not consider whether the introduction of new potential risks may cause gas supply anomalies in other existing and normally supplied regions around the new gas construction project, thereby leading to unnecessary increases in gas operation costs.

Therefore, it is desirable to a method, an Internet of Things (IoT) system, and a storage medium for smart gas construction supervision, which, when a new gas construction project is introduced, treat the gas pipeline network as a whole, promptly assess the impact of the newly introduced gas construction project on the existing gas pipelines, and generate appropriate pressure regulation instructions to the corresponding gas pressure regulation device, thereby allowing for the adjustment of at least one group of gas pipelines, and optimizing the overall operation of a gas supply system and reducing gas operation costs.

SUMMARY

One or more embodiments of the present disclosure provide a method for smart gas construction supervision. The method may be performed by a processor of a government supervision and management platform of an Internet of Things (IoT) system for smart gas construction supervision. The method comprises: obtaining monitoring image data of a construction region where a gas construction project is located from a gas supervision device; determining a project impact level and a project estimated completion time of the gas construction project based on the monitoring image data, sending the project impact level to a gas company management platform, and sending the project estimated completion time to a citizen user platform for announcement and display; determining regulatory parameters based on the project impact level and the project estimated completion time, and sending the regulatory parameters to a gas equipment object platform via the gas company management platform and a gas company sensing network platform, the gas equipment object platform including one or more gas pressure regulating devices, the regulatory parameters including pressure regulating parameters of at least one group of gas pipelines; obtaining pipeline pressure values of the at least one group of gas pipelines through the one or more gas pressure regulating devices; determining a fluctuation characteristic or a pressure difference distribution characteristic based on the pipeline pressure values; and generating a pressure regulating instruction based on the regulatory parameters, and the fluctuation characteristic or the pressure difference distribution characteristic, and sending the pressure regulating instruction to the one or more gas pressure regulating devices to perform pressure adjustment on the at least one group of gas pipelines based on the pressure regulating instruction.

One or more embodiments of the present disclosure provide an Internet of Things (IoT) system for smart gas construction supervision, comprising a citizen user platform, a government supervision service platform, a government supervision and management platform, a government supervision sensing network platform, a government supervision object platform, a gas company sensing network platform, a gas equipment object platform, a gas user service platform, and a gas user platform. The government supervision service platform includes a government safety supervision service platform; the government supervision and management platform includes a government safety supervision and management platform; the government supervision sensing network platform includes a government safety supervision sensing network platform; and the government supervision object platform includes a gas company management platform. The citizen user platform is configured to obtain user evaluation information, send the user evaluation information to the government supervision service platform, and receive project information and a project estimated completion time uploaded by the government supervision service platform. The government supervision service platform is configured to interact with the citizen user platform and the government safety supervision and management platform. The government supervision and management platform is configured to interact with the government safety supervision service platform and the government safety supervision sensing network platform. The government supervision sensing network platform is configured to interact with the gas company management platform, the government safety supervision and management platform, and the gas user service platform. The government supervision object platform is configured to interact with the gas company sensing network platform, the government safety supervision sensing network platform, and the gas user service platform. The gas equipment object platform is configured to interact with the gas company sensing network platform, and the gas user platform is configured to interact with the gas user service platform.

One or more embodiments of the present disclosure provide a non-transitory computer-readable storage medium, wherein the storage medium stores computer instructions, and when a computer reads the computer instructions in the storage medium, the computer executes the method for smart gas construction supervision described in the present disclosure.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
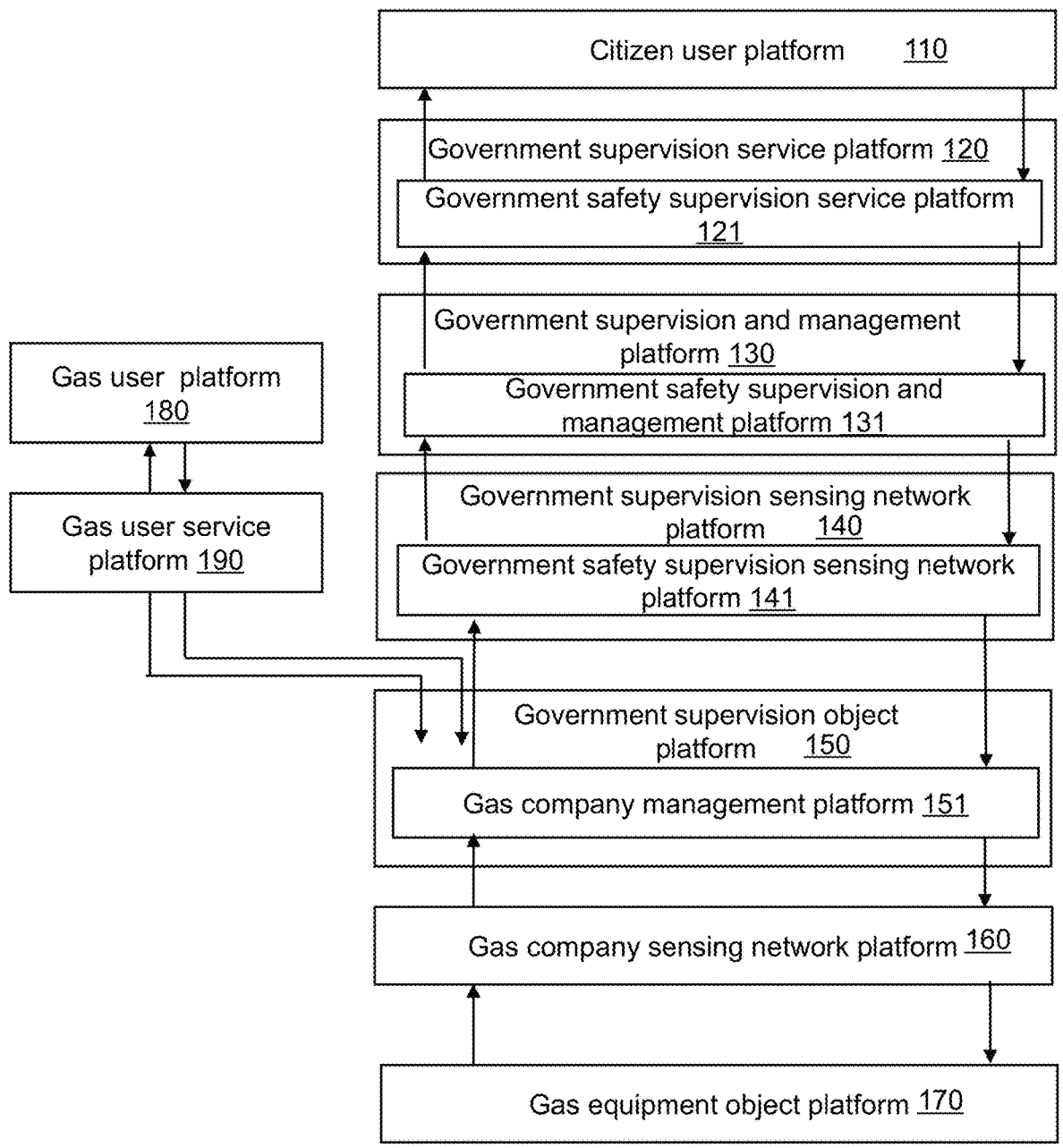
FIG. 1 is a schematic diagram of an Internet of Things (IoT) system for smart gas construction supervision according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a schematic diagram of an Internet of Things (IoT) system for smart gas construction supervision according to some embodiments of the present disclosure. It should be noted that the following embodiments are used only to illustrate the present disclosure and do not constitute a limitation on the present disclosure.

As shown in FIG. 1, an Internet of Things (IoT) system 100 for smart gas construction supervision may include a citizen user platform 110, a government supervision service platform 120, a government supervision and management platform 130, a government supervision sensing network platform 140, a government supervision object platform 150, a gas company sensing network platform 160, a gas equipment object platform 170, a gas user service platform 190, and a gas user platform 180.

The citizen user platform 110 is a platform that interacts with a user. In some embodiments, the citizen user platform 110 may be configured to obtain user evaluation information, send the user evaluation information to the government supervision service platform 120, and receive project information and a project estimated completion time uploaded by the government supervision service platform 120.

The government supervision service platform 120 is a platform that provides regulatory services to the government. In some embodiments, the government supervision service platform 120 may include a government safety supervision service platform 121. The government safety supervision service platform 121 may be a platform that provides safety regulatory services to the government.

The gas equipment object platform 170 is a functional platform for perceiving information generation and controlling information execution.

In some embodiments, the gas equipment object platform 170 may include at least one of one or more gas pressure regulating devices, one or more gas supervision devices, or the like.

The gas pressure regulating device is a device configured to regulate or monitor pipeline pressure in a gas pipeline.

The one or more gas pressure regulating devices may be deployed on gas pipelines. In some embodiments, the one or more gas pressure regulating devices may perform pressure adjustment on at least one group of gas pipelines based on a pressure regulating instruction issued by the gas equipment object platform 170.

The gas supervision device is a device that supervises a progress of a gas construction project. For example, the gas supervision device includes a drone, a video camera, a video recorder, or the like. More descriptions of the gas construction project may be found in the related descriptions of operation 210 in FIG. 2.

In some embodiments, the gas supervision device may be installed in a construction region. The gas supervision device may upload monitoring image data to the gas company management platform 151 via the gas company sensing network platform 160. More descriptions of the monitoring image data may be found in FIG. 2 and the corresponding descriptions.

In some embodiments, the gas supervision device may be configured to capture the monitoring image data of the construction region where the gas construction project is located. More descriptions of the construction region and the monitoring image data may be found in the related descriptions of operation 210 in FIG. 2.

The government supervision and management platform 130 is a platform for the government to conduct regulation and management. In some embodiments, the government supervision and management platform 130 may include a government safety supervision and management platform 131. The government safety supervision and management platform 131 may be a platform for the government to supervise and manage safety.

In some embodiments, the government safety supervision and management platform 131 may interact bi-directionally with the government supervision service platform 120. In some embodiments, the government safety supervision and management platform 131 may interact bi-directionally with the government supervision sensing network platform 140.

In some embodiments, the gas equipment object platform 170 includes the gas supervision device, and the government supervision and management platform 130 may include a processor and a communication device, the processor being disposed on a user terminal.

The communication device is a device for communicate within the IoT system for smart gas construction supervision and communicate between the IoT system for smart gas construction supervision and an external entity. In some embodiments, the communication device may be configured to enable communication between the gas supervision device and the processor. For example, the processor may upload the monitoring image data acquired by the gas supervision device to the gas company management platform 151 via the communication device.

In some embodiments, the communication device may be configured to communication between the gas supervision device and the processor.

The user terminal is a terminal for the user to interact with the IoT system for smart gas construction supervision.

In some embodiments, the user terminal may include at least one of a mobile device, a tablet computer, a laptop computer, a desktop computer, or the like.

In some embodiments, the processor is configured to obtain the monitoring image data from the gas supervision device, upload the monitoring image data to the gas company sensing network platform 160 via the communication device, and then upload the monitoring image data from the gas company sensing network platform 160 to the gas company management platform 151. The processor is also configured to determine a project impact level and a project estimated completion time of the gas construction project based on the monitoring image data, send the project impact level to the gas company management platform 151, and send the project estimated completion time to the citizen user platform 110 for announcement and display.

The processor is further configured to determine regulatory parameters based on the project impact level and the project estimated completion time, and send the regulatory parameters to the gas equipment object platform 170 via the gas company management platform 151 and the gas company sensing network platform 160. The gas equipment object platform 170 may include one or more gas pressure regulating devices, and the regulatory parameters may include regulatory parameters of at least one group of gas pipelines. The processor is further configured to obtain pipeline pressure values of the at least one group of gas pipelines through the one or more gas pressure regulating devices.

The processor is further configured to determine a fluctuation characteristic or a pressure difference distribution characteristic based on the pipeline pressure values; generate a pressure regulating instruction based on the regulatory parameters and the fluctuation characteristic or the pressure difference distribution characteristic, and send the pressure regulating instruction to the gas pressure regulating device, and the gas pressure regulating device performs pressure adjustment on the at least one group of gas pipelines based on the pressure regulating instruction.

In some embodiments, the project impact level is further related to a result of a current inspection of the gas construction project by a gas regulator and project progress of a previous inspection, the result of the current inspection and the project progress of the previous inspection being obtained from the government supervision service platform 120. The processor is further configured to: determine project information of the gas construction project based on the monitoring image data, the result of the current inspection, and the project progress of the previous inspection; determine the project estimated completion time of the gas construction project based on the project information; and determine the project impact level of the gas construction project based on the project information, the result of the current inspection, and the project estimated completion time.

In some embodiments, the pressure regulating parameters of the at least one group of gas pipelines are further related to a gas regulator arrangement, the gas regulator arrangement being obtained based on the government supervision and management platform 130. The processor is further configured to: determine the pressure regulating parameters of the at least one group of gas pipelines based on the project impact level, the project estimated completion time, and the gas regulator arrangement.

In some embodiments, the regulatory parameters further include an adjusted gas regulator arrangement. The processor is also configured to determine the adjusted gas regulator arrangement based on the project impact level and the project estimated completion time.

In some embodiments, the processor is further configured to: assess a potential problem probability in the construction region where the gas construction project is located based on the project impact level, the project estimated completion time, and the gas regulator arrangement, and determine the adjusted gas regulator arrangement based on the potential problem probability.

In some embodiments, the processor is further configured to: assess the potential problem probability in the construction region where the gas construction project is located based on the project impact level, the project estimated completion time, and the gas regulator arrangement, using a problem probability determination model, the problem probability determination model being a machine learning model.

More descriptions of the operations performed by the processor may be found in FIGS. 2-6 and the related descriptions thereof.

The government supervision sensing network platform 140 is an interface platform that enables interaction between the government supervision and management platform 130 and the government supervision object platform 150. The government supervision sensing network platform 140 may be configured as a communication network and gateway. In some embodiments, the government supervision sensing network platform 140 may include a government safety supervision sensing network platform 141. The government safety supervision sensing network platform 141 may be an interface platform that enables interaction between the government safety supervision and management platform 131 and the gas company management platform 151.

In some embodiments, the government supervision sensing network platform 140 is configured to interact with the gas company management platform 151, the government safety supervision and management platform 131, and the gas user service platform 190. For example, the government supervision object platform 150 may upload the monitoring image data of the construction region to the government supervision sensing network platform 140. More descriptions of uploading the monitoring image data of the construction region to the government supervision sensing network platform 140 may be found in FIG. 2 and the related descriptions thereof.

The government supervision object platform 150 may be a functional platform for perceiving sensing information generation and controlling information execution.

In some embodiments, the government supervision sensing network platform 140 and the government supervision object platform 150 may interact with each other for information exchange.

In some embodiments, the government supervision object platform 150 may include the gas company management platform 151. The gas company management platform 151 may be a platform for perceiving sensing information generation and controlling information execution. For example, the gas company management platform 151 may obtain the regulatory parameters. As another example, the gas company management platform 151 may transmit the pressure regulating parameters to the gas user service platform 190.

The gas company sensing network platform 160 may be an interface platform that enables interaction between the gas company management platform 151 and the gas equipment object platform 170, and the gas company sensing network platform 160 may be configured as a communication network and gateway. For example, the gas company sensing network platform 160 may send the regulatory parameters determined by the processor of the government supervision and management platform 130 to the gas equipment object platform 170.

The gas user platform 180 may be a user-driven platform that is configured to interact with a gas user. In some embodiments, the gas user platform is configured to interact with the gas user service platform 190.

The gas user service platform 190 may be a platform for receiving and transmitting data and/or information. For example, the gas user service platform 190 may be configured to receive demands from the gas user.

In the embodiments of the present disclosure, various platforms of the IoT system 100 for smart gas construction supervision may operate in a coordinated and regulated manner under the unified management of the gas company management platform 151, thereby optimizing the operation of an entire gas supply system.

In some embodiments, the platforms of the IoT system 100 for smart gas construction supervision may be divided into a smart gas primary network and a smart gas secondary network. The smart gas primary network refers to a network for a government user to regulate the operation of a gas pipeline network, and the smart gas secondary network includes a network a network for a gas company to monitor the operation of the gas pipeline network. In some embodiments, a same platform of the IoT system 100 for smart gas construction supervision may assume different roles in the smart gas primary network and the smart gas secondary network.

In some embodiments, the smart gas primary network may at least include a smart gas primary network user platform, a smart gas primary network service platform, a smart gas primary network management platform, a smart gas primary network sensing network platform, and a smart gas primary network object platform. The smart gas primary network user platform may include the citizen user platform 110, the smart gas primary network service platform may include the government supervision service platform 120, the smart gas primary network management platform may include the government supervision and management platform 130, the smart gas primary network sensing network platform may include the government supervision sensing network platform 140, and the smart gas primary network object platform may include the government supervision object platform 150.

In some embodiments, the smart gas secondary network may at least include a smart gas secondary network user platform, a smart gas secondary network service platform, a smart gas secondary network management platform, a smart gas secondary network sensing network platform, and a smart gas secondary network object. The smart gas secondary network user platform may include the gas user platform 180, the smart gas secondary network service platform may include the gas user service platform 190, the smart gas secondary network management platform may include the gas company management platform 151, the smart gas secondary network sensing network platform may include the gas company sensing network platform 160, and the smart gas secondary network object platform may include the gas equipment object platform 170.

More descriptions of the functions of the platforms of the IoT system 100 for smart gas construction supervision may be found in FIGS. 2-6 and the relevant descriptions thereof.

It should be noted that the above descriptions of the IoT system 100 for smart gas construction supervision is provided only for descriptive convenience, and do not limit the scope of the present disclosure to the cited embodiments.

Figure 2:
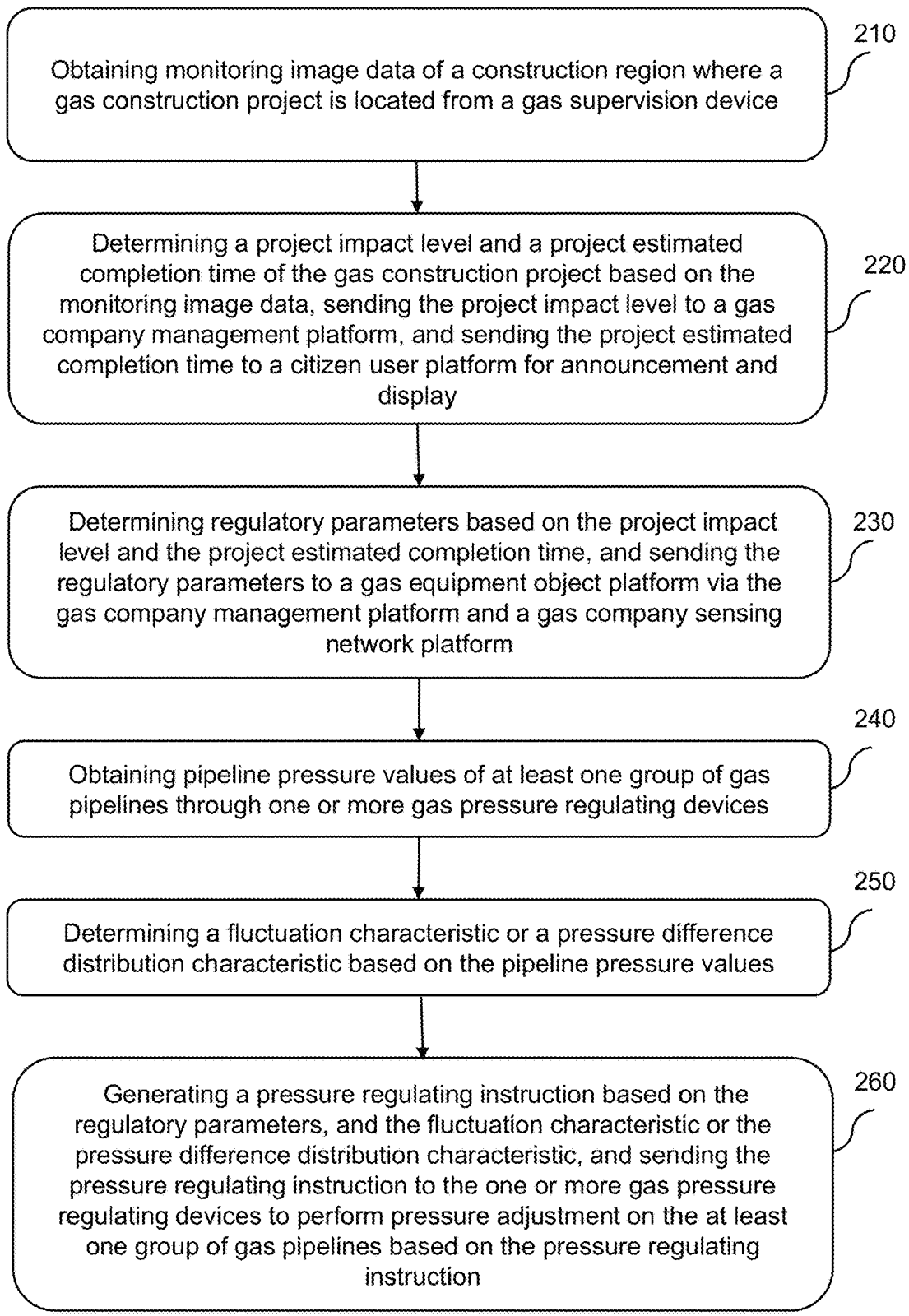
FIG. 2 is a flowchart of an exemplary process for smart gas construction supervision according to some embodiments of the present disclosure.

FIG. 2 is a flowchart of an exemplary process for smart gas construction supervision according to some embodiments of the present disclosure. In some embodiments, process 200 may be executed by a processor of the government supervision and management platform 130 of the IoT system 100 for smart gas construction supervision. As shown in FIG. 2, the process 200 may include operations 210-250 described below.

In 210, obtaining monitoring image data of a construction region where a gas construction project is located from a gas supervision device.

More descriptions of the gas supervision device may be found in the related descriptions in FIG. 1.

The gas construction project is a project related to construction of a gas pipeline and/or installation of a gas device. The gas device may include a gas meter, a gas stove, a water heater, or the like. For example, the gas construction project may include a new gas facility project, a gas pipeline renewal and reconstruction project, etc.

The construction region is an administrative region where the gas construction project is located. For example, the construction region could be the administrative region where the gas construction project is located, such as District b of City A. The monitoring image data is video data of the construction region where the gas construction project is located. In some embodiments, the monitoring image data may include a plurality of frames of monitoring video images. The plurality of frames of monitoring video images may reflect a construction condition in the construction region where the gas construction project is located.

In some embodiments, the processor may obtain the monitoring image data via the gas supervision device.

In 220, determining a project impact level and a project estimated completion time of the gas construction project based on the monitoring image data, sending the project impact level to a gas company management platform, and sending the project estimated completion time to a citizen user platform for announcement and display.

The project impact level refers to a degree to which a current construction process, etc., of the gas construction project affects an existing gas pipeline network in the construction region. In some embodiments, the project impact level may be expressed as a percentage, with a larger percentage indicating a greater project impact level.

For example, if a gas pipeline network in Region 1 in the District b of City A requires maintenance due to a fault, and some pipelines may be installed around the Region 1 due to a gas transportation layout, then the degree to which the maintenance in the Region 1 affects gas supply to pipelines installed around the Region 1 is referred to as the project impact level.

The project estimated completion time is an estimated time for completing the gas construction project.

In some embodiments, the processor may upload the monitoring image data to a government supervision service platform via the communication device, and the monitoring image data is evaluated by a gas regulator to obtain the project impact level and the project estimated completion time of the gas construction project. More descriptions of the communication device and the government supervision service platform may be found in the related description in FIG. 1.

In some embodiments, the project impact level is also related to a result of a current inspection of the gas construction project by the gas regulator and project progress of a previous inspection. The result of the current inspection and the project progress of the previous inspection are obtained from the government supervision service platform. The processor may also determine the project impact level and the project estimated completion time of the gas construction project in a manner described in FIG. 3 below.

More descriptions of the gas company management platform and the citizen user platform may be found in the related descriptions in FIG. 1.

In some embodiments, the processor may send the project estimated completion time to a citizen user platform via a display device (e.g., a display screen) on the citizen user platform for announcement and display.

In 230, determining regulatory parameters based on the project impact level and the project estimated completion time, and sending the regulatory parameters to a gas equipment object platform via the gas company management platform and a gas company sensing network platform.

In some embodiments, the gas equipment object platform may include one or more gas pressure regulating devices.

More descriptions of the gas pressure regulating device, the gas company sensing network platform, and the gas equipment object platform may be found in the related descriptions in FIG. 1.

The regulatory parameters are parameters for controlling the gas construction project.

In some embodiments, the regulatory parameters may include pressure regulating parameters of at least one group of gas pipelines. The pressure regulating parameters are parameters that adjust the pressure of gas supply for different gas pipelines. The gas pipelines are gas pipelines connecting a gas transmission station to gas users, not gas pipelines that extend into households of the gas users.

In some embodiments, the processor may determine, based on the project impact level and the project estimated completion time, a gas construction project whose project impact level is greater than a project impact level threshold and whose project estimated completion time is greater than a project time requirement threshold. The processor may further determine the regulatory parameters based on the project impact level and a difference between the project estimated completion time and the project time requirement threshold of the gas construction project via a first preset comparison table.

The first preset comparison table includes a correspondence between reference project impact levels, differences between reference project estimated completion times and reference project time requirement thresholds, and reference regulatory parameters. The first preset comparison table may be constructed based on prior knowledge or historical data.

The project impact level threshold is a critical value of the project impact level. The project time requirement threshold is a critical value of the project estimated completion time. The project impact level threshold and the project time requirement threshold may be predetermined by a person skilled in the art based on experience.

In some embodiments, the pressure regulating parameters are also associated with a gas regulator arrangement, the gas regulator arrangement being obtained based on the government supervision and management platform. The processor may determine the pressure regulating parameters of the at least one group of gas pipelines based on the project impact level, the project estimated completion time, and the gas regulator arrangement.

The gas regulator arrangement is a count of gas regulators assigned to the gas pipeline network in the construction region where the gas construction project is located.

In some embodiments, the processor may send the project impact level, the project estimated completion time, and the gas regulator arrangement to the government supervision service platform, where the regulator determines the pressure regulating parameters of the at least one group of gas pipelines.

Figure 5:
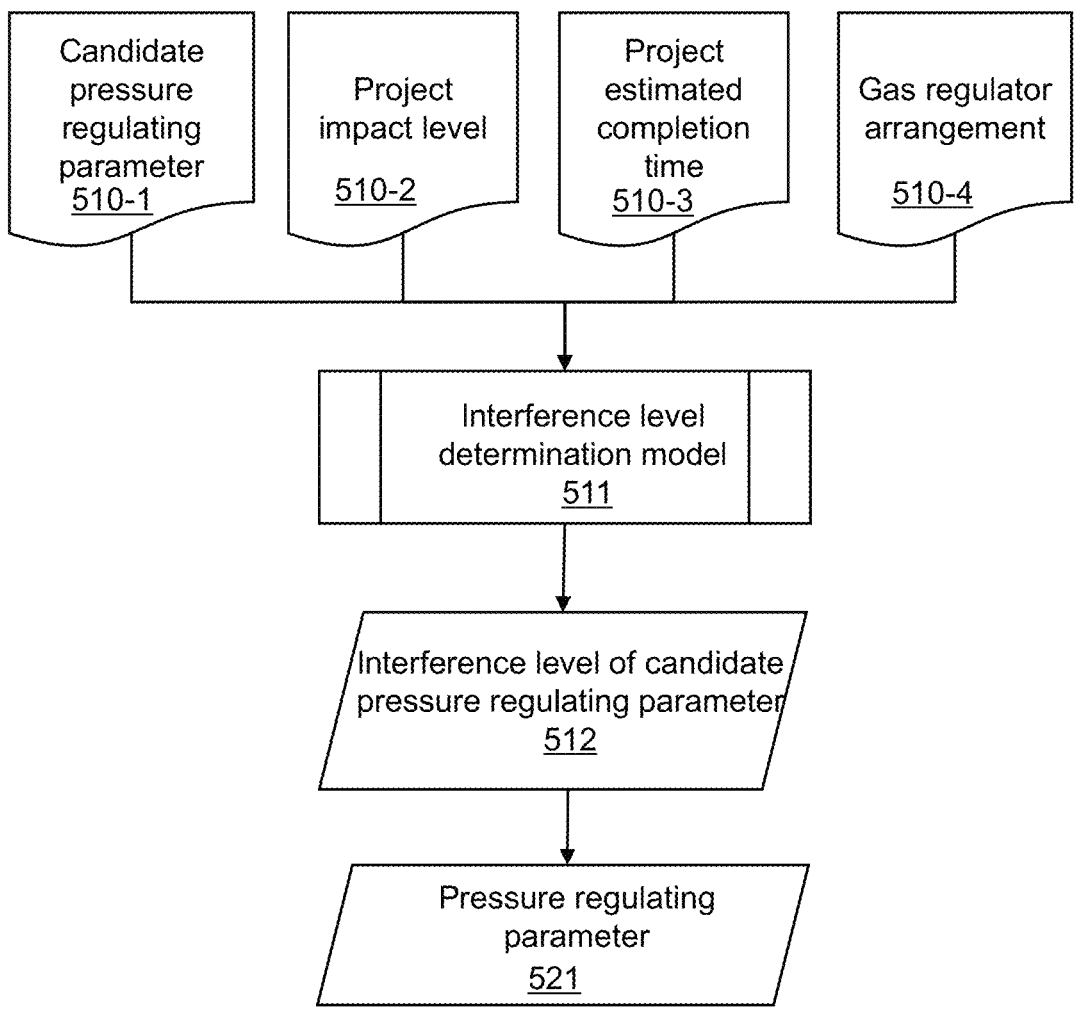
FIG. 5 is a flowchart of an exemplary process for determining pressure regulating parameters of at least one group of gas pipelines according to some embodiments of the present disclosure.

In some embodiments, the processor may determine the pressure regulating parameters of the at least one group of gas pipelines based on the project impact level, the project estimated completion time, and the gas regulator arrangement following the manner described in FIG. 5.

In some embodiments, the regulatory parameters also include an adjusted gas regulator arrangement. The processor may determine the adjusted gas regulator arrangement based on the project impact level and the project estimated completion time.

In some embodiments, the processor may determine the adjusted gas regulator arrangement based on the project impact level and the project estimated completion time through operations 711-713:

In 711, sorting project impact levels from low to high, selecting one or more gas construction projects with a relatively high project impact level and one or more gas construction projects with a relatively lower project impact level that meets a preset condition as a group of gas construction projects. The preset condition may include that a preset traffic distance between the gas construction project with the relatively high project impact level and the gas construction project with the relatively lower project impact level is within a preset value.

The relatively high project impact level means that the project impact level is greater than the project impact level threshold. In some embodiments, there may be one or more gas construction projects with the relatively high project impact level.

The project impact level threshold is a critical value of the project impact level, which may be predetermined by a person skilled in the art based on experience.

The traffic distance is a distance between the construction regions where two gas construction projects are located.

In some embodiments, the processor may designate a straight line distance between centers of the construction regions in which the two gas construction projects are located as the traffic distance.

The preset value is a preset traffic distance threshold. The preset value may be predetermined by a person skilled in the art based on experience.

In 712, for each group of different groups of gas construction projects, determining a count of gas regulators through weighted summation based on a count of projects in the group, the project impact level, and the project estimated completion time.

The count of projects in the group is the count of gas construction projects within the same group.

The count of gas regulator is the count of personnel required to supervise the gas construction projects within the group.

In some embodiments, the processor may determine the count of gas regulators using the following personnel number determination algorithm:

A count of gas regulators in group h=a1*a count of projects in group h+a2*sum {impact level of gas construction project i in group h}+a2*avg{estimated project completion time of gas construction project i in group h}, wherein a1, a2, and a3 denote any number greater than 0 and less than 1, which may be predetermined by a person skilled in the art based on experience, and h and i denote any positive integers.

In 713, determining the adjusted gas regulator arrangement based on the count of gas regulators.

In some embodiments, the processor may adjust the regulator arrangement within the current group based on the count of gas regulators to obtain the adjusted gas regulator arrangement. For example, if the processor determines that the count of gas regulators obtained using the personnel number determination algorithm is greater than a count of gas regulators that are actually arranged in a current group, the count of gas regulators within the current group may be increased based on a difference between the count of gas regulators obtained using the personnel number determination algorithm and the count of gas regulators that are actually arranged, thereby obtaining the adjusted gas regulator arrangement.

In some embodiments, the processor may also assess a potential problem probability in the construction region where the gas construction project is located based on the project impact level, the project estimated completion time, and the gas regulator arrangement, and determine the adjusted gas regulator arrangement based on the potential problem probability.

The potential problem probability in the construction region where the gas construction project is located refers to a probability of occurrence of problems after the gas construction project is placed in service.

In some embodiments, the processor may assess the potential problem probability in the construction region where the gas construction project is located through vector matching based on the project impact level, the project estimated completion time, and the gas regulator arrangement.

The processor may construct clustering vectors based on project impact levels, project estimated completion times, and gas regulator arrangements of gas construction projects in a historical database, and actual problem probabilities of the construction regions wherein the gas construction projects are located; perform clustering to form a preset count of clustering centers based on the clustering vectors; and determine the project impact level, the project estimated completion time, and the gas regulator arrangement of at least one gas construction project corresponding to the clustering centers as a standard vector.

For each gas construction project, the processor may construct, based on the project impact level, the project estimated completion time, and the gas regulator arrangement of the gas construction project, a vector-to-be-matched for the gas construction project, determine a similarity between the vector-to-be-matched and the standard vector, and take an actual problem probability of the construction region corresponding to the standard vector with a highest similarity as the potential problem probability of the construction region where the gas construction project is located.

In some embodiments, the processor may monitor the construction region where the gas construction project is located for a preset period, count occurrences of actual problems or duration of the actual problems, and determine the actual problem probability. For example, the processor may monitor the construction region where the gas construction project is located for a 24-hour period. If it is statistically determined that the occurrence of actual problems in the construction region is 1 occurrence in 24 hours, the actual problem probability may be $\frac{1}{24}$.

Figure 6:
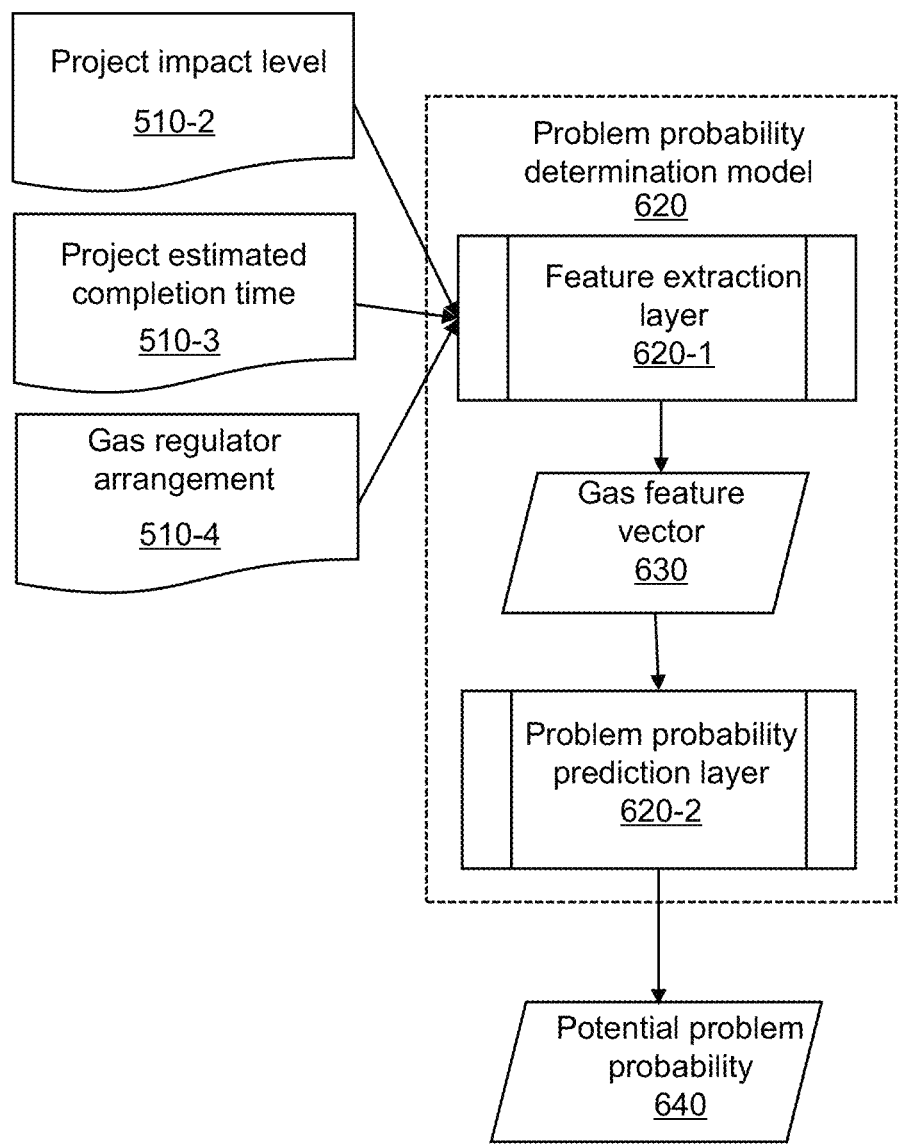
FIG. 6 is a flowchart of an exemplary process for assessing a potential problem probability in a construction region where a gas construction project is located according to some embodiments of the present disclosure.

In some embodiments, the specific manner of how the processor assesses the potential problem probability in the construction region where the gas construction project is located based on the project impact level, the project estimated completion time, and the gas regulator arrangement may be found in FIG. 6 and the related descriptions thereof.

In some embodiments, the processor may determine, based on the potential problem probability, a gas construction project with a potential problem probability greater than a problem probability threshold, and increase the count of gas regulators for the construction region in which the gas construction project with the potential problem probability greater than the problem probability threshold is located, thereby obtaining the adjusted gas regulator arrangement. The problem probability threshold may be preset by a person skilled in the art based on experience.

In some embodiments, the processor may determine the count of gas regulators based on the potential problem probability and the corresponding construction region in which the gas construction project is located through a second preset comparison table, compare the count of gas regulators with a current gas regulator arrangement for the construction region where the gas construction project is located, and determine a count of gas regulators that needs to be increased, thereby obtaining the adjusted gas regulator arrangement.

The second preset comparison table includes reference potential problem probabilities and corresponding reference counts of gas regulators for construction regions where reference gas construction projects are located. The second preset comparison table may be constructed based on prior knowledge or historical data.

For example, when constructing the second preset comparison table, after arranging different counts of gas regulators for the construction region where the gas construction project with the potential problem probability is located, the construction region is monitored for a preset period (e.g., 24 hours, etc.). The occurrences of actual problems corresponding to the different counts of gas regulators is counted, and a count of gas regulators corresponding to a lowest problem probability may be included in the second preset comparison table. The occurrences of actual problems may be a probability of a subsequent pipeline problem.

In some embodiments of the present disclosure, the adjusted gas regulator arrangement is determined by the potential problem probability, and the count of gas regulators may be appropriately increased for a gas construction project that has a relatively high potential problem probability, thereby improving reasonableness of the final adjusted gas regulator arrangement.

In 240, obtaining pipeline pressure values of the at least one group of gas pipelines through the one or more gas pressure regulating devices.

A pipeline pressure is a force exerted inside a gas pipeline.

In some embodiments, the processor may obtain the pipeline pressure values of the at least one group of gas pipelines through the one or more gas pressure regulating devices.

In 250, determining a fluctuation characteristic or a pressure difference distribution characteristic based on the pipeline pressure values.

The fluctuation characteristic refers to a characteristic related to the fluctuation of the pipeline pressure with time.

In some embodiments, the processor may determine a ratio of a standard deviation to an average value of the pipeline pressure values at different positions in the gas pipeline in the gas construction project as the fluctuation characteristic. The pipeline pressure values at the different locations may be obtained by the gas pressure regulating devices.

The pressure difference distribution characteristic is a characteristic related to a distribution of pressure differences between two different pressure measurement points within the pipeline.

In some embodiments, the processor may determine the average value of the pipeline pressure values at different locations within the gas pipeline in the gas construction project. Then the processor may determine, for each location in the gas pipeline, a difference between the pipeline pressure at the location and the average value based on the average value. The processor may statistically analyze differences between the pipeline pressure values at the different locations and the average value to determine the pressure difference distribution characteristics. The statistical analysis may include at least one of a tabulation technique, a classification technique, a graphical technique, or the like.

The fluctuation characteristic or the pressure difference distribution characteristic may reflect a tolerance range of the gas pipeline for gas pressure. If the pipeline pressure is fluctuating within the tolerance range, then the gas pipeline is normal. If the gas pressure is suddenly increased or decreased and exceed the tolerance range of the gas pipeline, it may lead to a dangerous situation for the gas pipeline.

In 260, generating a pressure regulating instruction based on the regulatory parameters, and the fluctuation characteristic or the pressure difference distribution characteristic, and sending the pressure regulating instruction to the one or more gas pressure regulating devices to perform pressure adjustment on the at least one group of gas pipelines based on the pressure regulating instruction.

The pressure regulating instruction is an instruction used to regulate the pipeline pressure.

In some embodiments, the processor may determine whether the regulatory parameters of the at least one group of gas pipelines is within the fluctuation characteristic or the pressure difference distribution characteristic based on the regulatory parameters. In response to the regulatory parameters being within the fluctuation characteristic or the pressure difference distribution characteristic, the regulatory parameters is maintained, and based on the regulatory parameters, the pressure regulating instruction is generated and sent to the corresponding the gas pipeline whose gas pressure needs to be regulated. If the regulatory parameters are not within the fluctuation characteristic or the pressure difference distribution characteristic, the regulatory parameters are discarded and no pressure regulation is performed.

For example, it is determined, based on the monitoring image data of the construction region where the gas construction project is located, that the pressure regulating parameter is to adjust the pipeline pressure upward by 100 Pa. If a limit value of the pipeline pressure is 500 Pa, and based on the pipeline pressure data obtained by the gas pressure regulating device, the determined fluctuation characteristic is that the pipeline pressure fluctuates in a range of 200 Pa to 400 Pa, the pipeline pressure fluctuation is relatively large, but is below the limit value of pipeline pressure. If the pipeline pressure is adjusted upward by 100 Pa in accordance with the determined pressure regulating parameter, then the adjusted pipeline pressure fluctuates in a range of 300 Pa to 500 Pa. Although the average value of the regulated pipeline pressure is 400 Pa, the average value does not reach the limit value of 500 Pa, which is a dangerous pipeline pressure. However, under an extreme fluctuation condition, the pipeline pressure may reach the limit value of 500 Pa, which may cause a rupture of the gas pipeline. Thus, after considering the fluctuation characteristic of the pipeline pressure, the regulatory parameter is abandoned, and no pressure regulation is performed.

In some embodiments of the present disclosure, when a new gas construction project is introduced, the gas pipeline network is taken as a whole, and the impact of the newly introduced gas construction project on the existing gas pipelines is timely assessed to generate suitable a pressure regulating instruction to the corresponding gas pressure regulating device to regulate the pressure of at least one group of the gas pipelines, thereby optimizing the operation of the overall gas supply system, reducing the occurrence of abnormalities in the gas supply of existing normal gas supply regions around the new gas construction project, and reducing gas operating costs.

Figure 3:
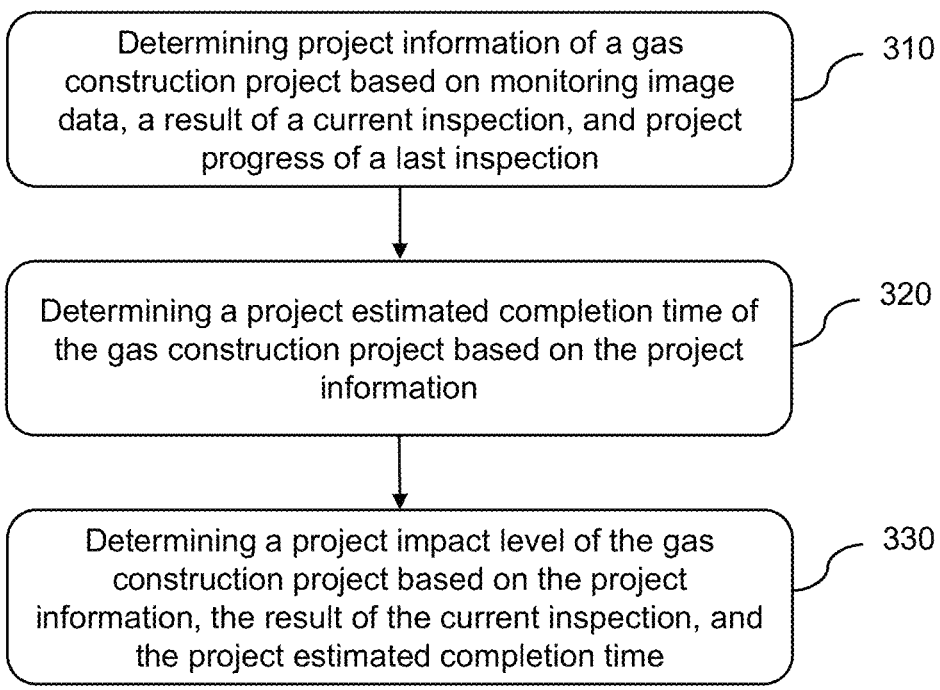
FIG. 3 is a flowchart of an exemplary process for determining a project impact level and a project estimated completion time of a gas construction project according to some embodiments of the present disclosure.

FIG. 3 is a flowchart of an exemplary process for determining a project impact level and a project estimated completion time of a gas construction project according to some embodiments of the present disclosure. In some embodiments, process 300 may be executed by a processor of the government supervision and management platform 130 of the IoT system 100 for smart gas construction supervision. As shown in FIG. 2, the process 300 may include operations 310-330.

In 310, determining project information of the gas construction project based on monitoring image data, a result of a current inspection, and project progress of a previous inspection.

More descriptions of the monitoring image data may be found in the description of operation 210 in FIG. 2.

The result of the current inspection is information related to the gas construction project obtained from the current inspection. For example, the result of the current inspection may include a damage condition of a gas pipeline around the gas construction project, a type of the gas construction project, and a location of the gas construction project. The gas pipeline around the gas construction project may be a gas pipeline within a region with a preset radius and centered on the construction region where the gas construction project is located. A size of the preset radius may be predetermined by a person skilled in the art based on experience.

In some embodiments, the processor may obtain the result of the current inspection via the government supervision service platform 120.

The project progress of the previous inspection refers to a progress of the gas construction project obtained during an inspection directly preceding the current inspection. Project progress of a current inspection refers to a current construction progress of the gas construction project obtained by inspection.

In some embodiments, each gas construction project may correspond to project progress of a previous inspection, and if the project progress of the current inspection project is project progress of a first inspection, the project progress of the previous inspection project may be represented as 0.

In some embodiments, the processor may access the project progress of the previous inspection project multiple times at a preset time interval via the government supervision service platform 120. The preset time interval may be preset by a person skilled in the art based on experience.

The project information is information related to the gas construction project. For example, the project information may include a type, a location, a construction scope of the gas construction project, the project progress of the current inspection, a distribution of existing surrounding gas facilities, and a time already spent on the construction of the gas construction project.

In some embodiments, the project information includes the project progress of the current inspection. The processor may perform noise filtering on the monitoring image data based on the monitoring image data. The processor may also randomly select a frame of a monitoring image from noise-filtered monitoring images as a first frame of the monitoring images. The processor may also extract at least one preset count of frames of monitoring images from the noise-filtered monitoring images based on a preset frame interval, and combine the first frame and the at least one preset count of frames to form a monitoring image sequence. The processor may also determine pixel differences between neighboring monitoring image frames in the monitoring image sequence to form a monitoring image pixel difference sequence. Based on the monitoring image pixel difference sequence, the result of the current inspection, and the project progress of the previous inspection, the processor may determine the project progress of the current inspection via a vector database.

In some embodiments, the processor may determine a first target feature vector based on the monitoring image pixel difference sequence, the result of the current inspection, and the project progress of the previous inspection project. The processor may also determine a first associated feature vector via the vector database based on the first target feature vector. The processor may also determine project progress of a reference inspection at a second historical time point corresponding to the first associated feature vector as a reference for the project progress of the current inspection for the gas construction project.

The vector database may include a plurality of first reference feature vectors, wherein each of the first reference feature vectors has a corresponding project progress of a reference inspection at a historical second time point. The first reference feature vectors are feature vectors constructed based on historical monitoring image pixel difference sequences, results of historical inspections, and project progresses of historical inspections at historical first time points. The historical first time points precede the historical second time points.

In some embodiments, the processor may determine first reference feature vectors in the vector database that satisfy a preset condition based on the first target feature vector, and determine a first reference feature vector that satisfy the preset condition as the first associated feature vector. In some embodiments, the preset condition may include having a minimum vector distance with the first target feature vector, etc. In some embodiments, the processor may determine the project progress of the reference inspection at the second historical time point corresponding to the first associated feature vector as the reference for the project progress of the current inspection for the gas construction project.

In 320, determining the project estimated completion time of the gas construction project based on the project information.

The project estimated completion time refers to a time required to complete the gas construction project, starting from a current time. For example, the project estimated completion time may be one year.

In some implementations, the processor may implement operations 810-811 to determine the project estimated completion time of the gas construction project.

In 810, determining an estimated construction period and a standard construction time based on the type of the gas construction project, the location of the gas construction project, and the project progress of the current inspection in the project information.

The standard construction time is an amount of time required to complete the gas construction project that is planned in advance.

The estimated construction period is an estimated time it may take to complete the entire gas construction project.

In some embodiments, the processor may determine the estimated construction period and the standard construction time based on the type of the gas construction project, the location of the gas construction project, and the project progress of the current inspection via a third preset comparison table. The third preset comparison table includes a corresponding relationship between reference types of gas construction projects, reference locations of gas construction projects, reference project progresses of inspections, reference construction periods, and reference standard construction times. The third preset comparison table may be constructed based on the pre-planning of the gas construction project.

In 811, predicting the project estimated completion time of the gas construction project based on the estimated construction period, the standard construction time, and a time already spend on construction.

The time already spend on construction refers to duration for which the gas construction project has already been under construction. The processor may obtain the time already spend on construction for the gas construction project from the government supervision service platform 120.

Merely by way of example, the processor may obtain the time already spend on construction based on a first algorithm:

$$T_e = \frac{T_c \cdot T_s}{(T_t - T_s)},$$

wherein $T_c$ denotes the time already spend on construction, $T_s$ denotes the standard construction time, $T_t$ denotes the estimated construction period, and $T_e$ denotes the estimated completion time.

In 330, determining a project impact level of the gas construction project based on the project information, the result of the current inspection, and the project estimated completion time.

More descriptions of the project impact level may be found in the description of operation 220 of FIG. 2.

In some embodiments, the processor may implement operations 910-920 to determine the project impact level of the gas construction project based on the project information, the result of the current inspection, and the project estimated completion time.

In 910, determining the estimated construction period and the standard construction time based on the type of the gas construction project, the location of the gas construction project, and the project progress of the current inspection in the project information.

The processor may determine the estimated construction period and the standard construction time based on the type of the gas construction project, the location of the gas construction project, and the project progress of the current inspection in the project information in a similar manner described in operation 810 above.

In 911, determining at least one gas pipeline impacted region via a fourth preset comparison table based on the damage condition of the gas pipeline around the gas construction project in the result of the current inspection.

In some embodiments, the damage condition of the gas pipeline may include a damaged gas pipeline.

A gas pipeline impacted region is a gas supply region affected by the damaged gas pipeline.

The fourth preset comparison table includes a correspondence between damage conditions of gas pipelines around reference gas construction projects and the at least one gas pipeline impacted region. The fourth preset comparison table may be constructed based on a pre-planned gas pipeline layout of the gas construction project.

In 912, determining the project impact level of the gas construction project based on the project estimated completion time, the estimated construction period, the standard construction time, and the at least one gas pipeline impacted region of the gas construction project.

In some embodiments, the processor may determine a project impact time of the gas construction project by a second algorithm described below based on the project estimated completion time, the estimated construction period, and the standard construction time of the gas construction project; determine a time impact factor by a third algorithm based on the project impact time; and determine the project impact level of the gas construction project based on the time impact factor and the at least one gas pipeline impacted region.

The time impact factor may be used to characterize a magnitude of a value of the project impact level of the gas construction project.

As an illustrative example only, the second algorithm may be expressed as: project impact time of gas construction project=project estimated completion time−(estimated construction period−standard construction time).

As an illustrative example only, the third algorithm may be expressed as: time impact factor of the gas construction project=project impact time/impact time threshold of the gas construction project. The impact time threshold may be predetermined by a person skilled in the art based on experience.

In some embodiments, the processor may designate a combination of the time impact factor and the at least one gas pipeline impacted region corresponding to the time impact factor as the project impact level of the gas construction project. The magnitude of the value of the time impact factor represents the magnitude of the project impact level of the gas construction project.

Figure 4:
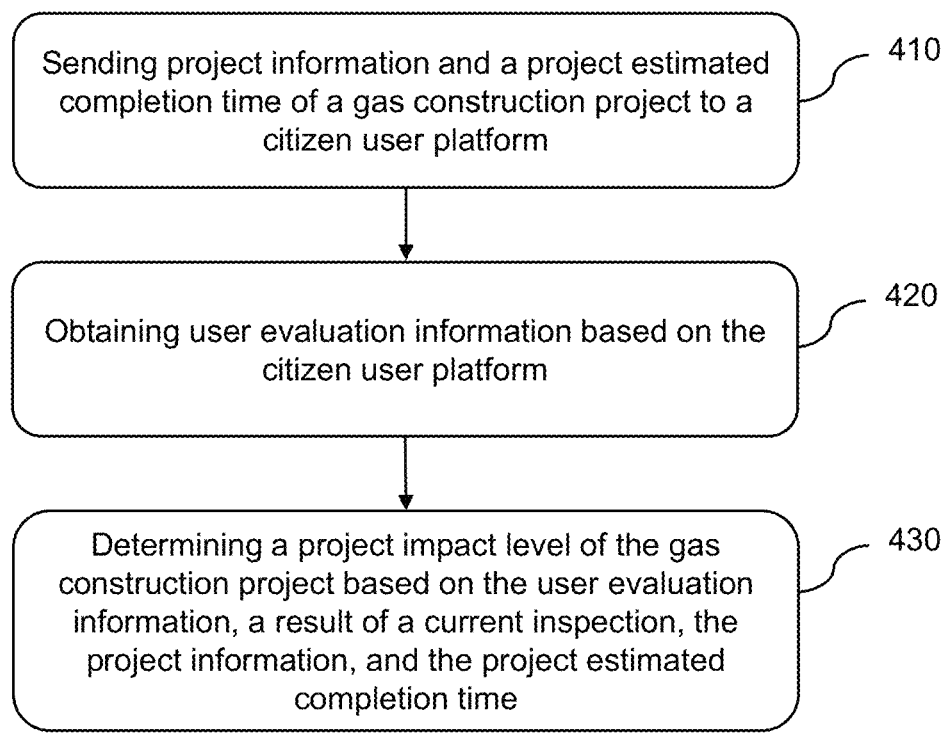
FIG. 4 is a flowchart of an exemplary process for determining a project impact level of a gas construction project according to some embodiments of the present disclosure.

In some embodiments, the processor may implement operations described in FIG. 4 to determine the project impact level of the gas construction project based on the project information and the project estimated completion time.

In some embodiments of the present disclosure, comprehensive project information of the gas construction project is determined by comprehensively analyzing the monitoring image data, the result of the current inspection, and the project progress of the previous inspection, which improves the accuracy of the determined project impact level and project estimated completion time of the gas construction project, thereby optimizing the operation of an entire gas supply system and reducing reduce gas operation costs.

FIG. 4 is a flowchart of an exemplary process for determining a project impact level of a gas construction project according to some embodiments of the present disclosure. In some embodiments, process 400 may be performed by a processor of the government supervision and management platform 130 of the IoT system 100 for smart gas construction supervision. As shown in FIG. 4, the process 400 may include operations 410-430.

In 410, sending project information and a project estimated completion time to a citizen user platform.

More descriptions of the project information and the project estimated completion time may be found in the related descriptions of FIG. 3. More descriptions of the citizen user platform may be found in the related descriptions of FIG. 1.

In some embodiments, the processor may send the project information and the project estimated completion time to the citizen user platform.

In 420, obtaining user evaluation information based on the citizen user platform.

The user evaluation information refers to a user's evaluation of an impact of a gas construction project on the gas supply in a gas region where the user is located. In some embodiments, the user evaluation information may include a plurality of ratings. For example, the user evaluation information may include three ratings: no impact, average impact, and great impact.

In some embodiments, the user may input the user evaluation information to the citizen user platform, and the processor may obtain the user evaluation information from the citizen user platform.

In 430, determining the project impact level of the gas construction project based on the user evaluation information, a result of a current inspection, the project information, and the project estimated completion time.

More descriptions of the project impact level may be found in the description of operation 330 in FIG. 3.

In some embodiments, the processor may determine the project impact level of the gas construction project by implementing operations 1010-1012:

In 1010, determining a time impact factor and at least one gas pipeline impacted region of the gas construction project based on the project information, the result of the current inspection, and the project estimated completion time.

The manner of determining the time impact factor and the at least one gas pipeline impacted region of the gas construction project is similar to the manner described in operations 910-912 in FIG. 3.

In 1011, determining an evaluation impact factor through a fifth preset comparison table based on the user evaluation information.

The fifth preset comparison table includes a correspondence between reference user evaluation information and reference evaluation impact factors. The fifth preset comparison table may be constructed based on the criteria of a constructed user evaluation system. The criteria of the user evaluation system refers to the criteria for constructing the evaluation ratings in the user evaluation information. The user evaluation system criteria may be predetermined by a person skilled in the art based on experience.

The evaluation impact factor may be used to characterize an extent to which user evaluations may have on the project impact level of the gas construction project.

In 1012, determining the project impact level of the gas construction project based on the time impact factor, the at least one gas pipeline impacted region, and the evaluation impact factor.

In some embodiments, the processor may determine an impact magnitude via a fourth algorithm based on the time impact factor and the evaluation impact factor, and determine the project impact level of the gas construction project based on the impact magnitude and the at least one gas pipeline impacted region.

Merely by way of example, the fourth algorithm may be expressed as: impact magnitude=k1*time impact factor of gas construction project+k2*average evaluation impact factor of gas construction project, wherein k1 and k2 may be greater than 0 and less than 1, which may be preset by a person skilled in the art preset based on experience. The average evaluative impact factor refers to an average of evaluation impact factors of a plurality of users for a same gas construction project.

In some implementations, the processor may combine the impact magnitude and the at least one gas pipeline impacted region to represent the project impact level of the gas construction project.

In some embodiments, the project impact level may also be related to an interference level of one or more the pressure regulating parameters of at least one group of gas pipelines. The processor may determine the project impact level of the gas construction project based on the interference level of one or more the pressure regulating parameters of at least one group of gas pipelines, the user evaluation information, the result of the current inspection, the project information, and the project estimated completion time.

The interference level is a level of interference by the pressure regulating parameters on existing gas-related production and living activities.

More descriptions of determining the interference level may be found in the related descriptions of FIG. 5.

In some embodiments, the processor may determine the project impact level of the gas construction project by implementing operations 1110-1113.

In 1110, determining the time impact factor and the at least one gas pipeline impacted region of the gas construction project based on the project information, the result of the current inspection, and the project estimated completion time.

More descriptions of operation 1110 may be found in the description of operations 910-912 in FIG. 3.

In 1111, determining the evaluation impact factor via the fifth preset comparison table based on the user evaluation information.

More descriptions of operation 1111 may be found in the description of operation 1011 in FIG. 4.

In 1112, designating the interference level of the one or more pressure regulating parameter of the at least one group of gas pipelines as a regulation impact factor.

In some embodiments, the processor may determine the interference level using an interference level determination model based on the pressure regulating parameters of the gas construction project, the project impact level, the project estimated completion time, and the gas regulator arrangement. More descriptions of the interference level determination model may be found in the related descriptions of FIG. 5.

The regulation impact factor may be used to characterize the interference level of the pressure regulating parameters of the gas construction project.

In 1113, determining the project impact level of the gas construction project based on the time impact factor, the at least one gas pipeline impacted region, the evaluation impact factor, and the regulation impact factor.

More descriptions of the time impact factor and the at least one gas pipeline impacted region may be found in related descriptions of operation 330 in FIG. 3. More descriptions of the evaluation impact factor may be found in related descriptions of operation 1011 in FIG. 4.

In some embodiments, the processor may determine the impact magnitude using a fifth algorithm based on the time impact factor, the evaluation impact factor, and the regulation impact factor, and determine the project impact level of the gas construction project based on the impact magnitude and the at least one gas pipeline impacted region.

Merely by way of example, the fifth algorithm may be expressed as: impact magnitude=k1*time impact factor of gas construction project+k2*average evaluation impact factor of gas construction project+k3*regulation impact factor of the gas construction project, wherein k1, k2 and k3 are greater than 0 and less than 1, and k1, k2 and k3 may be preset by a person skilled in the art based on experience. More descriptions of the average evaluation impact factor may be found in the related description above.

In some embodiments, the processor may combine the impact magnitude and the at least one gas pipeline impacted region to represent the project impact level of the gas construction project.

In some embodiments of the present disclosure, in the process of determining the project impact level of the gas construction project, the user evaluation information is also taken into account, which further improves the accuracy of the determined project impact level of the gas construction project. Then, based on the accurate project impact level, a suitable pressure regulating instruction can be generated and sent to the corresponding gas pressure regulating device to regulate the pressure of the at least one group of gas pipelines, thereby optimizing the operation of the entire gas supply system, reducing gas operating costs, and improving user satisfaction.

In addition, in the process of determining the project impact levels of the gas construction project, the interference level of the pressure regulating parameters of the at least one group of gas pipelines are also taken into account to minimize the impact of the pressure regulating parameters on existing gas-related production and living activities, thus further improving the accuracy of the determined project impact level of the gas construction project.

FIG. 5 is a flowchart of an exemplary process for determining pressure regulating parameters of at least one group of gas pipelines according to some embodiments of the present disclosure. In some embodiments, process 500 may be executed by a processor of the government supervision and management platform 130 of the IoT 100 system for smart gas construction supervision. As shown in FIG. 5, the process 500 may include operations 510-520.

In 510, determining an interference level 512 of a candidate pressure regulating parameter 510-1 based on a candidate pressure regulating parameter, a project impact level 510-2, a project estimated completion time 510-3, and a gas regulator arrangement 510-4 using an interference level determination model 511.

The candidate pressure regulating parameter 510-1 is a pressure regulating parameter to be determined. More descriptions of the project impact level 510-2, the project estimated completion time 510-3, and the gas regulator arrangement 510-4 may be found in FIG. 2 and the related descriptions thereof.

In some embodiments, the interference level determination model 511 may be a machine learning model. In some embodiments, a type of the interference level determination model may include a Neural Networks (NN) model and a Convolutional Neural Networks (CNN) model.

In some embodiments, the interference level determination model 520 may be obtained by training a large count of first training samples with first training labels.

In some embodiments, each set of the first training samples may include the pressure regulating parameter, the project impact level, the project estimated completion time, and the gas regulator arrangement of a historical sample gas construction project. In some embodiments, the first training samples may be obtained based on historical data.

In some embodiments, the first training label may be the interference level of the pressure regulating parameter of the historical sample gas construction project. In some embodiments, the processor may determine the interference level of the candidate pressure regulating parameter of the historical sample gas construction project based on actual gas supply problems that occur during a subsequent construction process corresponding to the first training sample. The gas supply problems may include insufficient gas supply, gas outage, or the like.

In some embodiments, the processor may determine the interference level of the pressure regulating parameter of the historical sample gas construction project by performing a weight summation on frequencies of the actual gas supply problems. For example, during the subsequent construction process corresponding to the first training sample, if the actual gas supply problems include the insufficient gas supply and the gas outage. The processor may statistically obtain a frequency of insufficient gas supply and a frequency of gas outages in historical data from the government safety supervision service platform 121. The processor may then determine the interference level of the pressure regulating parameter of the historical sample gas construction project using a following weighted summation algorithm:

interference level of the pressure regulating parameter=$w_1 \times x1 + w_2 \times x2$, wherein x1 denotes the frequency of insufficient gas supply, x2 denotes the frequency of gas outages, $w_1$ and $w_2$ are the weights corresponding to insufficient gas supply and gas outages, respectively, and $w_1$ and $w_2$ are greater than 0 and less than 1.

In some embodiments, the weights corresponding to different problems may be manually preset or set by system default depending on a severity of the problem.

In some embodiments, the processor may input a plurality of first training samples with first training labels into the initial interference level determination model, construct a loss function based on the first training labels and a result of the initial interference level determination model, and iteratively update parameters of the initial interference level determination model based on the loss function via gradient descent or other techniques. Training of the initial interference level determination model is completed when a preset condition is satisfied, and the trained interference level confirmation model is obtained. The preset condition may be include the loss function converges, a count of iterations reaching a threshold, or the like.

In some embodiments, the processor may input the candidate pressure regulating parameter 510-1, the project impact level 510-2, the project estimated completion time 510-3, and the gas regulator arrangement 510-4 into the trained interference level determination model 511 to determine the interference level 512 of the candidate pressure regulating parameter.

In 520, determining pressure regulating parameters 521 of the at least one group of gas pipelines based on the interference level 512.

More descriptions of the pressure regulating parameter 521 may be found in the description of operation 230 of FIG. 2.

In some embodiments, for candidate pressure regulating parameters of each of the at least one group of gas pipelines, the processor may sum the interference levels of the candidate pressure regulating parameters of all gas pipelines in each of the at least one group of gas pipelines, and designate candidate pressure regulating parameters of a group of gas pipelines with a smallest total interference level as the pressure regulating parameters of the at least one group of gas pipelines.

In some embodiments of the present disclosure, through the interference level determination model, it is possible to more accurately and quickly assess the interference level of the candidate pressure regulating parameters of each group of gas pipelines, and then select the candidate pressure regulating parameters of the group of gas pipelines with a smallest total interference level as the pressure regulating parameters of the at least one group of gas pipelines for the operation of the gas supply system, thus realizing the stability of the gas supply under different construction conditions when new gas construction projects are introduced.

FIG. 6 is a flowchart of an exemplary process for assessing a potential problem probability in a construction region where a gas construction project is located, as shown according to some embodiments of the present disclosure. In some embodiments, process 600 may be performed by a processor of the government supervision and management platform 130 of the IoT system 100 for smart gas construction supervision.

In some embodiments, the processor may assess a potential problem probability 640 in the construction region where the gas construction project is located using a problem probability determination model 620 based on the project impact level 510-2, the project estimated completion time 510-3, and the gas regulator arrangement 510-4.

More descriptions of the project impact level 510-2, the project estimated completion time 510-3, the gas regulator arrangement 510-4, and the potential problem probability 640 may be found in FIG. 2 and the related descriptions thereof.

In some embodiments, the problem probability determination model 620 may be a machine learning model. In some embodiments, a type of the problem probability determination model 620 may include a neural networks (NN) model, or the like.

In some embodiments, the problem probability determination model 620 may be obtained by training a large count of second training samples with a second training label.

In some embodiments, each set of second training samples may include a project impact level, a project estimated completion time, and a gas regulator arrangement of a historical sample gas construction project.

In some embodiments, the second training label may be a probability of a subsequent actual gas pipeline failure of the historical sample gas construction project. For example, the second training label may be represented as 0 or 1, with 0 representing no gas pipeline failures occurred within a preset time period (e.g., 24 hours) after the completion of the historical sample gas construction project, and 1 representing a gas pipeline failure occurred within the preset time period after the completion of the historical sample gas construction project.

In some embodiments, the second training samples and the second training label may be obtained from historical data.

In some embodiments, the problem probability determination model 620 may include a feature extraction layer 620-1 and a problem probability prediction layer 620-2, both the feature extraction layer 620-1 and the problem probability prediction layer 620-2 being neural network models.

In some embodiments, the feature extraction layer 620-1 may be configured to process the project impact level 510-2, the project estimated completion time 510-3, and the gas regulator arrangement 510-4 to determine a gas feature vector 630.

The gas feature vector 630 is a vector consisting of the project impact level 510-2, the project estimated completion time 510-3, and the gas regulator arrangement 510-4.

In some embodiments, the problem probability prediction layer 620-2 may be configured to process the gas feature vector 630 output from the feature extraction layer 620-1 to determine the potential problem probability 640 in the construction region where the gas construction project is located.

In some embodiments, the problem probability determination model 620 may be obtained through joint training of the feature extraction layer 620-1 and the problem probability prediction layer 620-2 based on a large count of third training samples with third labels.

In some embodiments, each set of third training samples may include a project impact level, a project estimated completion time, and a gas regulator arrangement of a historical sample gas construction project. The third label may be a probability of subsequent actual gas pipeline failures occurring in the construction region where the historical sample gas construction project is located. In some embodiments, the third label may be obtained from historical data or labeled manually.

In some embodiments, the processor may monitor the construction region where the historical sample gas construction project is located for a preset amount of time after the completion of the historical sample gas construction project, count the occurrence or duration of actual gas pipeline failures, and determine the probability of actual gas pipeline failures. For example, the processor may perform statistical analysis on the construction region where the historical sample gas construction project is located 24 hours after the completion of the historical sample gas construction project. If the occurrence of the gas pipeline failure is 1 occurrence in 24 hours, the probability of actual gas pipeline failures is $1/24$. As another example, the processor may perform statistical analysis on the construction region where the historical sample gas construction project is located 24 hours after the completion of the historical sample gas construction project. If the duration of gas pipeline failure occurs is 1 hour, the actual problem probability is $1/24$.

In some embodiments, the project impact levels, the project estimated completion times, and the gas regulator arrangements of historical sample gas construction projects in the third training samples with third labels may be input into an initial feature extraction layer, and then the gas feature vector output from the initial feature extraction layer is input into the initial problem probability prediction layer, a loss function is constructed based on the third labels and prediction results of the initial problem probability prediction layer, and parameters of the initial feature extraction layer and the initial problem probability prediction layer are iteratively updated based on the loss function until the loss function converges or a count of iterations reaches a threshold, etc., and the training is completed to obtain a trained problem probability determination model.

In some embodiments, a training process of the problem probability determination model may include at least a first stage of training. The first stage of training may include sequentially training based on a first training set, validation based on a first validation set, and testing based on a first test set.

The first training set is a set of training samples used to train the initial problem probability determination model. In some embodiments, the processor may use the first training set as the third training samples for training the initial problem probability determination model to obtain the trained problem probability determination model.

The first validation set is a set of training samples used to adjust a hyper-parameter of the trained problem probability determination model. The hyper-parameter is a parameter that needs to be set manually.

In some embodiments, the processor may input the first validation set into a trained problem probability determination model with different sets of hyper-parameters, and then, based on the quality of predicted results of the problem probability determination model with different sets of hyper-parameters, determine which set of hyper-parameters correspond to the best performance. For example, the more accurate the prediction result is, the better the performance of the corresponding set of hyper-parameters.

The first test set is a set of training samples used to test the performance of the problem probability determination model with adjusted hyper-parameters. In some embodiments, the processor may input the first test set into the problem probability determination model with the adjusted hyper-parameters to verify the accuracy of the predicted results of the problem probability determination model with the adjusted hyper-parameters. The testing may include inputting the training samples in the first test set, into the problem probability determination model with the adjusted hyper-parameters, and compare an output of the problem probability determination model with the adjusted hyper-parameters with the corresponding labels in the first test set. The closer the output is to the corresponding labels in the first test set, the more accurate the prediction result of the problem probability determination model with the adjusted hyper-parameters is.

In some embodiments, the first training set, the first test set, and the first validation set are datasets extracted from historical data and may include the project impact level, the project estimated completion time, and the gas regulator arrangement of historical gas construction projects. A data amount of the first training set, a data amount of the first test set, and a data amount of the first validation set are in a first preset ratio. The first training set, the first test set, and the first validation set do not have overlap data, and a statistical difference of samples of the first training set is greater than a preset difference threshold, the preset difference threshold being related to an average construction duration of the historical gas construction projects.

The first preset ratio is a predetermined ratio of the amount of data in the first training set, the first test set, and the first validation set. For example, the first preset ratio may be set as:data amount of the first training set:data amount of the first test set:data amount of the first validation set=8:1:1.

The first training set, the first test set, and the first validation set do not have overlap data means that a same training sample only exists in one of the first training set, the first test set, or the first validation set.

The sample statistical difference refers to a diversity among the training samples in the first training set. In some embodiments, the greater the diversity among the training samples in the first training set is, the greater the sample statistical difference is.

In some embodiments, the processor may quantify the "project impact level," the "project estimated completion time," and the "gas regulator arrangement" of each sample in the first training set, i.e., each training sample corresponds to a numerical vector. The processor may determine a vector distance (e.g., a cosine distance) between each pair of training samples in the first training set, determine a plurality of vector distances and a variance of the plurality of vector distances, and determine the sample statistical difference based on the variance. For example, the greater the variance is, the greater the sample statistical difference is.

In some embodiments, the processor may quantify each training sample in the first training set as a number through a sixth preset comparison table based on the first training set. The sixth preset comparison table includes a correspondence between reference training samples and reference quantified numbers corresponding to the reference training samples. The sixth preset comparison table may be constructed based on prior knowledge or historical data. For example, if an element of a training sample is already a numerical number, then the quantified value of the element may be directly equal to the numerical number of the element itself.

The preset difference threshold is a predetermined threshold for the sample statistical difference. In some embodiments, the preset difference threshold correlates to the average construction duration of historical gas construction projects.

In some embodiments, the processor may obtain the duration of a plurality of historical gas construction projects via the government supervision and management platform 130, and then determine the average construction duration of the plurality of historical gas construction projects to obtain the average construction duration of the historical gas construction projects.

In some embodiments, the longer the average construction duration of historical gas construction projects is, the greater the preset difference threshold is.

In some embodiments of the present disclosure, the problem probability determination model can evaluate the potential problem probability in the region where the gas construction project is located, thereby enabling a rapid assessment of the potential problem probability in the region.

Meanwhile, in the training process of the problem probability determination model, by introducing the sample statistical difference and setting the sample statistical difference of the first training set to be greater than the preset difference threshold, the robustness of the trained problem probability determination model is enhanced, thereby preventing overfitting of the trained problem probability determination model.

Additionally, the preset difference threshold is related to the average construction duration of historical gas construction projects. The longer the average construction duration is, the more complex the construction situation is, thus involving more potential impacts from various aspects. Therefore, the preset difference threshold may be increased to allow the problem probability determination model to learn from a more broadly distributed set of training samples, thereby improving the accuracy of predictions made by the trained problem probability determination model.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for smart gas construction supervision, wherein the method is performed by a processor of a government supervision and management platform of an Internet of Things (IoT) system for smart gas construction supervision, and the method comprises:

obtaining monitoring image data of a construction region where a gas construction project is located from a gas supervision device;

determining a project impact level and a project estimated completion time of the gas construction project based on the monitoring image data, sending the project impact level to a gas company management platform, and sending the project estimated completion time to a citizen user platform for announcement and display, wherein the project impact level is related to a result of a current inspection of the gas construction project by a gas regulator and project progress of a previous inspection, the result of the current inspection and the project progress of the previous inspection are obtained from the government supervision service platform, and the determining a project impact level and a project estimated completion time of the gas construction project based on the monitoring image data includes:

determining project information of the gas construction project based on the monitoring image data, the result of the current inspection, and the project progress of the previous inspection;

determining the project estimated completion time of the gas construction project based on the project information; and determining the project impact level of the gas construction project based on the project information, the result of the current inspection, and the project estimated completion time;

determining regulatory parameters based on the project impact level and the project estimated completion time, and sending the regulatory parameters to a gas equipment object platform via the gas company management platform and a gas company sensing network platform, the gas equipment object platform including one or more gas pressure regulating devices, the regulatory parameters including pressure regulating parameters of at least one group of gas pipelines and an adjusted gas regulator arrangement, wherein the pressure regulating parameters are related to a gas regulator arrangement, the gas regulator arrangement is obtained based on the government supervision and management platform, and the determining regulatory parameters based on the project impact level and the project estimated completion time includes:

determining the pressure regulating parameters of the at least one group of gas pipelines based on the project impact level, the project estimated completion time, and the gas regulator arrangement;

determining the adjusted gas regulator arrangement based on the project impact level and the project estimated completion time, including:

assessing a potential problem probability in the construction region where the gas construction project is located through a problem probability determination model based on the project impact level, the project estimated completion time, and the gas regulator arrangement; wherein the problem probability determination model is a supervised machine learning model and includes a feature extraction layer and a problem probability prediction layer, the feature extraction layer and the problem probability prediction layer being both neural network models;

a training process of the problem probability determination model includes at least a first stage of training, the first stage of training includes a training based on a first training set, a validation based on a first validation set, and a testing based on a first test set, wherein the first training set, the first test set, and the first validation set are data sets extracted from historical data and include the project impact level, the project estimated completion time, and a gas regulator arrangement of historical gas construction projects, a data amount of the first training set, a data amount of the first test set, and a data amount of the first validation set are in a first preset ratio; the first training set, the first test set, and the first validation set do not have overlap data, and a statistical difference of samples of the first training set is greater than a preset difference threshold, the preset difference threshold is related to an average construction duration of the historical gas construction projects; and
determining the adjusted gas regulator arrangement based on the potential problem probability;
obtaining pipeline pressure values of the at least one group of gas pipelines through the one or more gas pressure regulating devices;
determining a fluctuation characteristic or a pressure difference distribution characteristic based on the pipeline pressure values; and
generating a pressure regulating instruction based on the regulatory parameters, and the fluctuation characteristic or the pressure difference distribution characteristic, and sending the pressure regulating instruction to the one or more gas pressure regulating devices to perform pressure adjustment on the at least one group of gas pipelines based on the pressure regulating instruction.

2. The method of claim 1, wherein the IoT system for smart gas construction supervision further includes the citizen user platform, a government supervision service platform, a government supervision sensing network platform, a government supervision object platform, the gas company sensing network platform, a gas equipment object platform, a gas user service platform, and a gas user platform;
the government supervision service platform includes a government safety supervision service platform;
the government supervision and management platform includes a government safety supervision and management platform;
the government supervision sensing network platform includes a government safety supervision sensing network platform; and
the government supervision object platform includes the gas company management platform;
the citizen user platform is configured to obtain user evaluation information, send the user evaluation information to the government supervision service platform, and receive project information and the project estimated completion time uploaded by the government supervision service platform;
the government supervision service platform is configured to interact with the citizen user platform and the government safety supervision and management platform;
the government supervision and management platform is configured to interact with the government safety supervision service platform and the government safety supervision sensing network platform;
the government supervision sensing network platform is configured to interact with the gas company management platform and the government safety supervision and management platform;
the government supervision object platform is configured to interact with the gas company sensing network platform, the government safety supervision sensing network platform, and the gas user service platform;
the gas equipment object platform is configured to interact with the gas company sensing network platform; and
the gas user platform is configured to interact with the gas user service platform.

3. The method of claim 2, wherein the gas equipment object platform includes the gas supervision device, the government supervision and management platform includes the processor and a communication device, and the processor is located on a user terminal;
the gas supervision device is configured to capture the monitoring image data of the construction region where the gas construction project is located and upload the monitoring image data to the gas company management platform via the gas company sensing network platform, wherein the gas supervision device includes a drone, a video camera, and a video recorder; and
the communication device is configured to communicate between the gas supervision device and the processor.

4. The method of claim 1, wherein the generating the pressure regulating instruction based on the regulatory parameters, and the fluctuation characteristic or the pressure difference distribution characteristic includes:
determining whether regulatory parameters of the at least one group of gas pipelines is within the fluctuation characteristic or the pressure difference distribution characteristic based on the regulatory parameters;
in response to the regulatory parameters being within the fluctuation characteristic or the pressure difference distribution characteristic, maintaining the regulatory parameters, generating the pressure regulating instruction based on the regulatory parameters, and sending the pressure regulating instruction to corresponding gas pipeline whose gas pressure needs to be regulated; and
in response to the regulatory parameters being not within the fluctuation characteristic or the pressure difference distribution characteristic, discarding the regulatory parameters and performing no pressure regulation.

5. The method of claim 1, wherein the determining the adjusted gas regulator arrangement based on the project impact level and the project estimated completion time further includes:
adjusting the gas regulator arrangement in a current group to a specific number based on a count of gas regulators; and
controlling the gas regulators to operate based on the specific number.

6. The method of claim 1, wherein the determining the project impact level of the gas construction project based on the project information, the result of the current inspection, and the project estimated completion time includes:
sending the project information and the project estimated completion time to the citizen user platform;
obtaining user evaluation information based on the citizen user platform; and
determining the project impact level of the gas construction project based on the user evaluation information, the result of the current inspection, the project information, and the project estimated completion time.

7. The method of claim 6, wherein the project impact level is further related to an interference level of the pressure regulating parameters of the at least one group of gas pipelines; and the determining the project impact level of the gas construction project based on the user evaluation information, the result of the current inspection, the project information, and the project estimated completion time includes:
   determining the project impact level of the gas construction project based on the interference level of the pressure regulating parameters of the at least one group of gas pipelines, the user evaluation information, the project information, the result of the current inspection, and the project estimated completion time.

8. The method of claim 1, wherein the determining the pressure regulating parameters of the at least one group of gas pipelines based on the project impact level, the project estimated completion time, and the gas regulator arrangement includes:
   determining, based on a candidate pressure regulating parameter, the project impact level, the project estimated completion time, and the gas regulator arrangement using an interference level determination model, an interference level of the candidate pressure regulating parameter, the interference level determination model being a machine learning model; and
   determining the pressure regulating parameters of the at least one group of gas pipelines based on the interference level.

9. An Internet of Things (IoT) system for smart gas construction supervision, comprising a citizen user platform, a government supervision and management platform, a government supervision sensing network platform, a government supervision object platform, a gas company sensing network platform, a gas equipment object platform, a gas user service platform, and a gas user platform; wherein
   the government supervision service platform includes a government safety supervision service platform;
   the government supervision and management platform includes a government safety supervision and management platform;
   the government supervision sensing network platform includes a government safety supervision sensing network platform; and
   the government supervision object platform includes a gas company management platform;
   the citizen user platform is configured to obtain user evaluation information, send the user evaluation information to the government supervision service platform, and receive project information and a project estimated completion time uploaded by the government supervision service platform;
   the government supervision service platform is configured to interact with the citizen user platform and the government safety supervision and management platform;
   the government supervision and management platform is configured to interact with the government safety supervision service platform and the government safety supervision sensing network platform;
   the government supervision sensing network platform is configured to interact with the gas company management platform, the government safety supervision and management platform, and the gas user service platform;
   the government supervision object platform is configured to interact with the gas company sensing network platform, the government safety supervision sensing network platform, and the gas user service platform;
   the gas equipment object platform is configured to interact with the gas company sensing network platform;
   the gas user platform is configured to interact with the gas user service platform;
   the gas equipment object platform includes a gas supervision device, a processor, a communication device, and a user terminal, the processor being disposed on the user terminal;
   the gas supervision device is configured to capture monitoring image data of a construction region where a gas construction project is located;
   the communication device is configured to communicate between the gas supervision device and the processor;
   the processor is configured to:
   obtain the monitoring image data from the gas supervision device and upload the monitoring image data to the gas company management platform through the communication device;
   determine a project impact level and a project estimated completion time of the gas construction project based on the monitoring image data, send the project impact level to a gas company management platform, and send the project estimated completion time to the citizen user platform for announcement and display, wherein the project impact level is related to a result of a current inspection of the gas construction project by a gas regulator and project progress of a previous inspection, the result of the current inspection and the project progress of the previous inspection are obtained from the government supervision service platform, and to determine the project impact level and the project estimated completion time of the gas construction project based on the monitoring image data, the processor is further configured to:
   determine project information of the gas construction project based on the monitoring image data, the result of the current inspection, and the project progress of the previous inspection;
   determine the project estimated completion time of the gas construction project based on the project information; and
   determine the project impact level of the gas construction project based on the project information, the result of the current inspection, and the project estimated completion time;
   determine regulatory parameters based on the project impact level and the project estimated completion time, and send the regulatory parameters to the gas equipment object platform via the gas company management platform and a gas company sensing network platform, the gas equipment object platform including one or more gas pressure regulating devices, the regulatory parameters including pressure regulating parameters of at least one group of gas pipelines and an adjusted gas regulator arrangement, wherein the pressure regulating parameters are related to a gas regulator arrangement, the gas regulator arrangement is obtained based on the government supervision and management platform, and to determine the regulatory parameters based on the project impact level and the project estimated completion time, the processor is further configured to:
   determine the pressure regulating parameters of the at least one group of gas pipelines based on the project impact level, the project estimated completion time, and the gas regulator arrangement;

determining the adjusted gas regulator arrangement based on the project impact level and the project estimated completion time including:

assessing a potential problem probability in the construction region where the gas construction project is located through a problem probability determination model based on the project impact level, the project estimated completion time, and the gas regulator arrangement; wherein the problem probability determination model is a supervised machine learning model and includes a feature extraction layer and a problem probability prediction layer, the feature extraction layer and the problem probability prediction layer being both neural network models;

a training process of the problem probability determination model includes at least a first stage of training, the first stage of training includes a training based on a first training set, a validation based on a first validation set, and a testing based on a first test set, wherein the first training set, the first test set, and the first validation set are data sets extracted from historical data and include the project impact level, the project estimated completion time, and a gas regulator arrangement of historical gas construction projects, a data amount of the first training set, a data amount of the first test set, and a data amount of the first validation set are in a first preset ratio; the first training set, the first test set, and the first validation set do not have overlap data, and a statistical difference of samples of the first training set is greater than a preset difference threshold, the preset difference threshold is related to an average construction duration of the historical gas construction projects; and determining the adjusted gas regulator arrangement based on the potential problem probability:

obtain pipeline pressure values of the at least one group of gas pipelines through the one or more gas pressure regulating devices;

determine a fluctuation characteristic or a pressure difference distribution characteristic based on the pipeline pressure values; and generate a pressure regulating instruction based on the regulatory parameters, and the fluctuation characteristic or the pressure difference distribution characteristic, and send the pressure regulating instruction to the one or more gas pressure regulating devices to perform pressure adjustment on the at least one group of gas pipelines based on the pressure regulating instruction.

* * * * *